(12) United States Patent
Ahn

(10) Patent No.: US 7,733,005 B2
(45) Date of Patent: Jun. 8, 2010

(54) LIGHT EMISSION DEVICE AND DISPLAY DEVICE PROVIDED WITH THE SAME

(75) Inventor: Sang-Hyuck Ahn, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 359 days.

(21) Appl. No.: 11/818,271

(22) Filed: Jun. 13, 2007

(65) Prior Publication Data
US 2008/0106182 A1    May 8, 2008

(30) Foreign Application Priority Data
Nov. 2, 2006    (KR) .................. 10-2006-0107749

(51) Int. Cl.
*H01J 1/62* (2006.01)
(52) U.S. Cl. ..................... 313/495; 313/309
(58) Field of Classification Search ................ 313/495, 313/309, 336, 351
See application file for complete search history.

(56) References Cited

FOREIGN PATENT DOCUMENTS

| JP | 07-254385 | 10/1995 |
| JP | 11-073898 A | 3/1999 |
| JP | 2000-276999 A | 10/2000 |
| KR | 10 2004 0057866 A | 7/2004 |
| KR | 10 2004 0072762 A | 8/2004 |

*Primary Examiner*—Vip Patel
(74) *Attorney, Agent, or Firm*—Knobbe Martens Olson & Bear LLP

(57) ABSTRACT

A light emission device and a display device provided with the same are disclosed. In one embodiment, the light emission device includes i) first and second substrates opposing each other, ii) a plurality of cathode electrodes that are arranged on the first substrate and spaced apart from each other, iii) a gate electrode that is electrically insulated from the cathode electrodes, iv) an insulation layer formed between the gate electrode and the cathode electrodes, wherein the insulation layer comprises first and second opposing surfaces which are directed to the first and second substrates, respectively, and wherein a plurality of opening are defined in the gate electrode and the insulation layer, v) a plurality of electron emitters that are electrically connected to each of the cathode electrodes and located in the openings, respectively, wherein the plurality of electron emitters are configured to emit electrons toward the second substrate, via the plurality of openings, respectively, vi) a phosphor layer that is formed on the second substrate, wherein the emitted electrons are configured to collide the phosphor layer and vii) an anode electrode that is located on the second substrate, wherein the second substrate is configured to emit light by way of excitation of the phosphor layer, wherein the gate electrode substantially completely covers the second surface of the insulation layer.

14 Claims, 7 Drawing Sheets

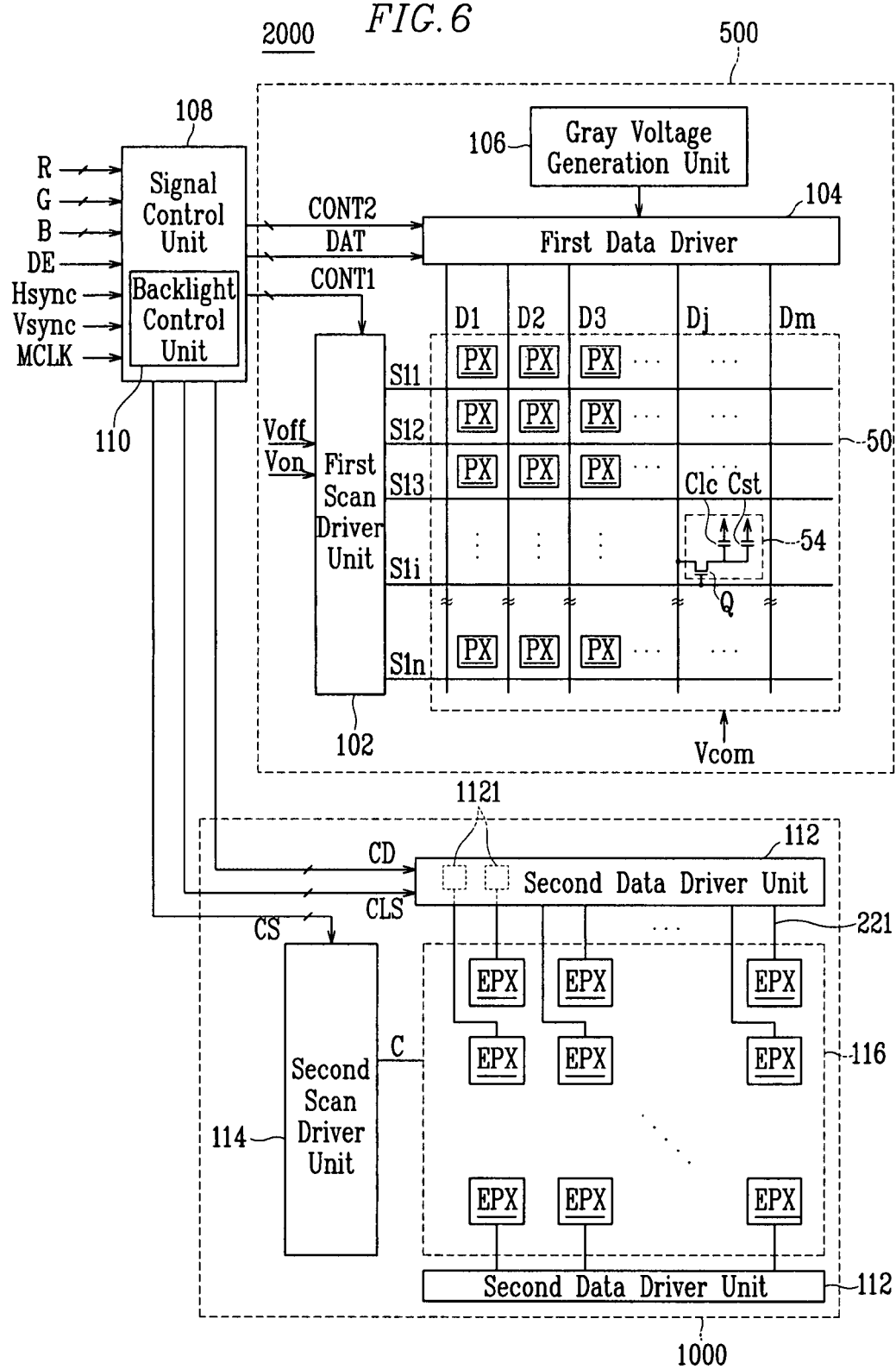

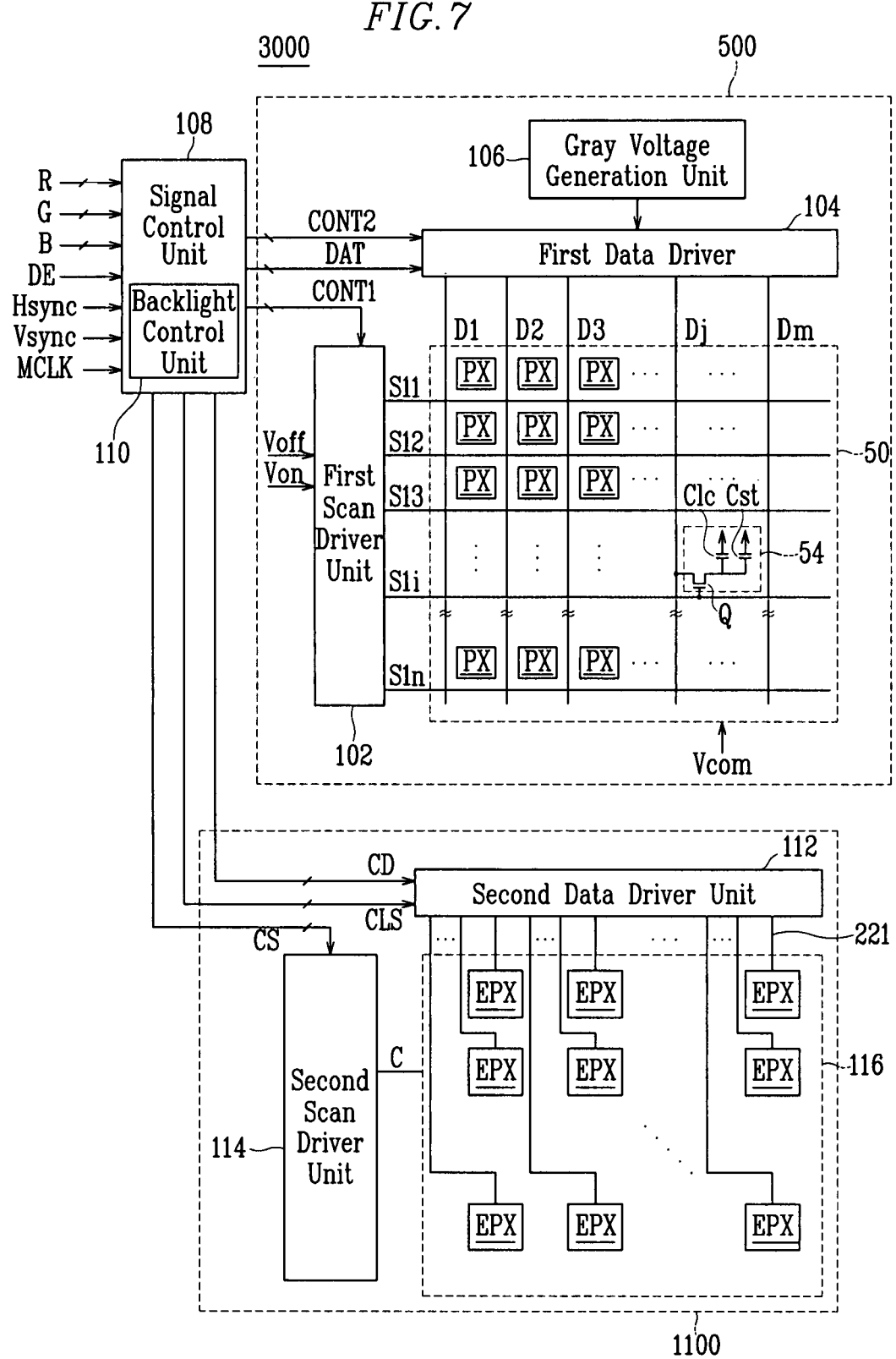

LIGHT EMISSION DEVICE AND DISPLAY DEVICE PROVIDED WITH THE SAME

CROSS-REFERENCE TO RELATED APPLICATION

This application makes claims priority to and the benefit of Korean Patent Application No. 10-2006-0107749 filed on Nov. 2, 2006 in the Korean Intellectual Property Office, the entire content of which is incorporated herein by reference.

BACKGROUND OF THE INVENTION

1. Field of the Invention

The present invention relates to a light emission device and a display device including the same.

2. Description of Related Technology

As an electron emission element, a field emitter array (FEA) type is known. The FEA type electron emission element includes an electron emission region, and cathode and gate electrodes functioning as driving electrodes for controlling the electron emission of the electron emission region. The electron emission region is formed of a material having a relatively lower work function or a relatively large aspect ratio, e.g., a carbon-based material such as carbon nanotubes, graphite, and diamond-like carbon so as to effectively emit electrons when an electric field is formed around the electron emission regions under a vacuum atmosphere.

The electron emission elements are arrayed on a first substrate to constitute an electron emission device. The electron emission device is combined with a second substrate, on which a light emission unit having phosphor layers and an anode electrode is formed, to constitute a light emission device.

SUMMARY OF CERTAIN INVENTIVE ASPECTS

One aspect of the present invention provides an active light emission device in which no arc discharge occurs between an anode electrode and an insulation layer. Another aspect of the present invention provides a display device provided with the light emission device.

An aspect of the invention provides a light emission device comprising: i) first and second substrates opposing each other, ii) a plurality of cathode electrodes that are arranged on the first substrate and spaced apart from each other, iii) a gate electrode that is electrically insulated from the cathode electrodes, iv) an insulation layer formed between the gate electrode and the cathode electrodes, wherein the insulation layer comprises first and second opposing surfaces which are directed to the first and second substrates, respectively, and wherein a plurality of opening are defined in the gate electrode and the insulation layer, v) a plurality of electron emitters that are electrically connected to each of the cathode electrodes and located in the openings, respectively, wherein the plurality of electron emitters are configured to emit electrons toward the second substrate, via the plurality of openings, respectively, vi) a phosphor layer that is formed on the second substrate, wherein the emitted electrons are configured to collide the phosphor layer and vii) an anode electrode that is located on the second substrate, wherein the second substrate is configured to emit light by way of excitation of the phosphor layer, wherein the gate electrode substantially completely covers the second surface of the insulation layer.

The above device may further comprise a plurality of conductor lines, which are connected to the plurality of cathode electrodes, respectively, and configured to apply driving voltages to the cathode electrodes, wherein at least one of the conductor lines is configured to pass through a passage defined between adjacent cathode electrodes and extends to peripheral portions of the first substrate, wherein the peripheral portions are directed to the second substrate, and wherein the cathode electrodes are not formed on the peripheral portions.

In the above device, as the length of a conductor line increases, the width of the conductor line increases. In the above device, the number of the electron emitters and corresponding openings increases as the electron emitters extend away from the peripheral portions of the first substrate. The above device may further a plurality of integrated circuits, which are connected to the plurality of conductor lines, respectively, and configured to generate the driving voltages.

The above device may further comprise a plurality of conductor lines, which are connected to the plurality of cathode electrodes, respectively, and configured to apply driving voltages to the plurality of cathode electrodes, respectively, wherein the cathode electrodes are divided into a first cathode electrode group and a second cathode electrode group, wherein first lines among the conductor lines are connected to the respective cathode electrodes of the first cathode group and second lines among the conductor lines are connected to the respective cathode electrodes of the second cathode group, and wherein the first and second lines extend away from each other.

The above device may further comprise a plurality of conductor lines each of which is connected to at least two of the cathode electrodes and configured to apply a common voltage thereto. In the above device, the at least two cathode electrodes are adjacent to each other. In the above device, the insulation layer further comprises third and fourth surfaces located in the openings, and wherein the second surface of the insulation layer does not include the third and fourth surfaces.

Another aspect of the invention provides a display device comprising: i) the above light emission device, wherein the light emission device is configured to generate light and ii) a display panel configured to receive the generated light as a backlight source and display images. In the above device, the display panel comprises a plurality of first pixels arranged in lines and columns which are substantially perpendicular to each other, wherein the light emission device comprises a plurality of second pixels arranged in the lines and columns and wherein one of the second pixels corresponds to a plurality of the first pixels.

In the above device, at least one of the second pixels is independently driven. In the above device, the plurality of first pixels comprise a pixel having the highest gray level among the plurality of first pixels, and wherein the second pixel is configured to emit light in response to the highest gray level. In the above device, the display panel comprises a liquid crystal panel.

Still another aspect of the invention provides a display device comprising: i) a display panel comprising; a plurality of first gate lines configured to transmit scan signals, a plurality of first data lines configured to transmit first data signals, and a plurality of first pixels defined by the first gate lines and the first data lines and having respective pixel circuits, ii) a light emission portion comprising; a second gate line configured to transmit a common signal, a plurality of second data lines configured to transmit second data signals, and a plurality of second pixels defined by the second data lines and the second gate line, wherein the field emission portion is configured to generate light, and wherein the display panel is configured to receive the generated light as a backlight source and display images and iii) a signal control unit configured to transmit a driving signal to the display panel and the field emission portion, wherein each of the second pixels corresponds to at least two of the first pixels and wherein the plurality of second data lines are connected to the plurality of second pixels, respectively, and wherein the signal control unit is further configured to independently drive the second pixels.

In the above device, the plurality of first pixels comprise a pixel having the highest gray level among the plurality of first pixels, and wherein each of the second pixels is configured to emit light in response to the highest gray level. In the above device, the signal control unit is configured to apply a second data signal, which corresponds to a first data signal of the first pixel having the highest gray level, to one of the second pixels in response to a timing point where the first data signal is initially applied to the at least two first pixels. The above device may further comprise a gate electrode that is connected to the second gate line and configured to receive the common signal; and a cathode electrode that is connected to one of the second data lines and configured to receive a corresponding second data signal, wherein each of the second pixels is configured to emit light by a voltage difference between the gate electrode and one of the cathode electrodes.

In the above device, the plurality of first pixels comprise a pixel having the highest gray level among the plurality of first pixels, and wherein the signal control unit is configured to apply a data voltage which is configured to display the highest gray level to one of the cathode electrodes in response to a timing point where the first data signal is initially applied to the at least two first pixels. In the above device, the signal control unit is configured to generate a control signal which is configured to display the highest gray level among the gray levels of the at least two first pixels on one of the second pixels, and wherein the data voltage corresponds to the control signal.

In the above device, the signal control unit is configured to apply a second data signal, which corresponds to a first data signal of the first pixel having the highest gray level, to one of the second pixels in response to a timing point where the first data signal is initially applied to the at least two first pixels during a time corresponding to the highest gray level. In the above device, the signal control unit is configured to apply a data voltage which is configured to display the highest gray level to one of the cathode electrodes in response to a timing point where the first data signal is initially applied to the at least two first pixels.

In the above device, the signal control unit is configured to generate a light emission signal which is configured to display the highest gray level among the gray levels of the at least two first pixels on one of the second pixels. In the above device, the light emission signal is digital data which is not less than 6 bits. The above device may further comprise a plurality of integrated circuits configured to generate second data signals, wherein the integrated circuits are connected to the respective second data lines. In the above device, the integrated circuits are configured to be driven when the scan signals are transmitted to the at least two first pixels.

BRIEF DESCRIPTION OF THE DRAWINGS

FIG. 6 is a block diagram of a driving unit of the display device of FIG. 5.

FIG. 7 is a block diagram of a driving unit of a display device according to another exemplary embodiment of the present invention.

DETAILED DESCRIPTION OF CERTAIN INVENTIVE EMBODIMENTS

Figure 1:
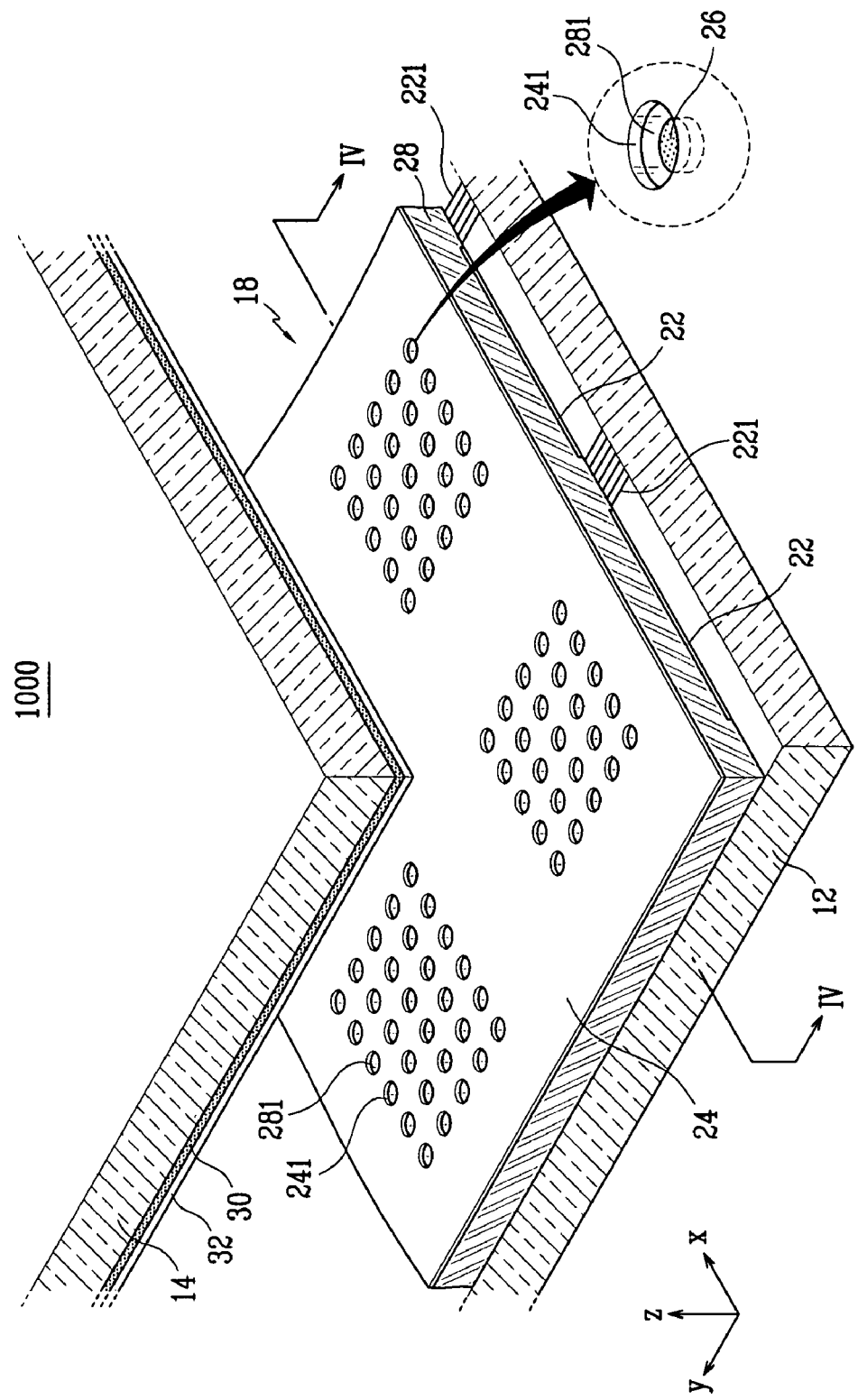
FIG. 1 is a fragmentary schematic exploded perspective view of a light emission device according to an exemplary embodiment of the present invention.

With reference to the accompanying drawings, embodiments of the present invention will be described in order for those skilled in the art to be able to implement it. As those skilled in the art would realize, the described embodiments may be modified in various different ways, all without departing from the spirit or scope of the present invention. Wherever possible, the same reference numbers will be used throughout the drawings to refer to the same or like parts.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," "over," and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein are interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to perspective views that are schematic illustrations of embodiments of the present invention. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. As an example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

In exemplary embodiments of the present invention, a light emission device (field emission device or electron emission device; hereinafter three terms will be interchangeably used) includes all of devices that can emit light to an external side so that the light emission can be externally recognized. Therefore, all of display devices that can transmit information by displaying symbols, characters, numbers, and/or other images may be regarded as the light emission device. Since the light emission device may use an external light source as well as an internal light source, a device for reflecting external light may be regarded as the light emission device.

Reference will now be made in detail to exemplary embodiments of the present invention. The invention should not be construed as being limited to the exemplary embodiments set forth herein; rather, the exemplary embodiments are provided so that this disclosure will be through and complete, and will fully convey the concept of the invention to those skilled in the art.

FIG. 1 shows a fragmentary schematic exploded perspective view of a light emission device 1000 according to an exemplary embodiment of the present invention. In an enlarged circle of FIG. 1, an electron emission region is enlarged.

As shown in FIG. 1, a light emission device 1000 includes first and second substrates 12 and 14 facing each other. A space defined between the first and second substrates 12 and 14 is exhausted to be kept to a degree of vacuum of about $10^{-6}$ Torr. In order to form the space between the first and second substrates 12 and 14, spacers (40 of FIG. 4) are located between the first and second substrates 12 and 14. The first and second substrates 12 and 14 may be formed of, for example, transparent glass.

An electron emission unit 18 may be located on the first substrate 12. The electron emission unit 18 includes a plurality of cathode electrodes 22, a plurality of electron emission regions 26, and an integrated gate electrode 24. An insulation layer 28 is located between the gate electrode 24 and the cathode electrodes 22 to prevent a short circuit between the gate electrode 24 and the cathode electrodes 22.

The cathode electrodes 22 are arranged on the first substrate 12 and spaced apart from each other. Therefore, one pixel can be formed at each of the cathode electrodes 22. Each of the cathode electrodes 22 is applied with a data driving voltage to function as a data electrode. A conductor line 221 connected to each of the cathode electrodes 22 extends to a side surface of the light emission device 1000 to apply the driving voltage to the relevant cathode electrode 22. The arrangement of the cathode electrodes 22 will be described in more detail hereinafter with reference to FIGS. 2 and 3.

In one embodiment, as shown in FIG. 1, the gate electrode 24 is monolithically formed. Therefore, the plurality of the cathode electrodes 22 may correspond to one gate electrode 24. Since the gate electrode 24 is formed in a single unit, a common voltage is applied to the gate electrode 24. The cathode and gate electrodes 22 and 24 may be formed of a conductive material such as indium tin oxide (ITO) or metal. The gate electrode 24 is electrically insulated from the cathode electrodes 22 by the insulation layer 28.

The gate electrode 24 substantially completely covers portions of the insulation layer 28 which are directed to the second substrate 14. Since the gate electrode 24 is monolithically formed, the portions of the insulation layer 28 are not exposed toward the second substrate 14. Therefore, no arc discharge occurs between the insulation layer 28 and an anode electrode 32.

In a typical electron emission device, a plurality of gate electrodes are arranged in a stripe pattern and thus the insulation layer is exposed between the gate electrodes. Hence, some of the electrons emitted from the electron emission regions are continuously accumulated on the insulation layer. In addition, when a high voltage is applied to the anode electrode, this high voltage mutually acts with the electrons accumulated on the insulation layer. This causes arc discharge. When arc discharge occurs, the electron emission device may malfunction or the service life of the electron emission device may be reduced. Therefore, a resistive material is coated on the insulation layer between the gate electrodes to prevent arc discharge. This causes an increase in manufacturing costs.

However, in an exemplary embodiment of the present invention, since the gate electrode 24 covers the insulation layer 28, the electrons emitted from the electron emission regions 26 are not accumulated on the insulation layer 28. Therefore, arc discharge minimally occurs (or is prevented) and thus malfunctioning and service life reduction of the light emission device 1000 can be prevented.

As shown in FIG. 1, the electron emission regions 26 are located at the light emission pixels where the cathode electrodes 22 overlap with the gate electrode 24. The electron emission regions 26 are electrically connected to the cathode electrodes 22 or the gate electrode 24. In FIG. 1, the electron emission regions 26 are electrically connected to the cathode electrodes 22.

As shown in the enlarged circle of FIG. 1, openings 281 and 241 are respectively formed in the insulation layer 28 and the gate electrode 24 in order to allow the electrons emitted from the electron emission region 26 to pass therethrough. By a difference between the voltages that are respectively applied to the cathode electrodes 22 and the gate electrode 24, the electrons are emitted from the electron emission regions 26.

The electron emission regions 26 are formed of a material emitting electrons when an electric field is applied thereto under a vacuum atmosphere, such as a carbon-based material or a nanometer-sized material. For example, the electron emission regions 26 can be formed of carbon nanotubes, graphite, graphite nanofibers, diamonds, diamond-like carbon, fullerene $C_{60}$, silicon nanowires or a combination thereof. The electron emission regions 26 may be formed through a screen-printing process, a direct growth process, chemical deposition, or a sputtering process. Alternatively, the electron emission regions 26 may be formed in a tip structure formed of a Mo-based or Si-based material.

As shown in FIG. 1, the light emission pixels differ in the number of the electron emission regions 26 depending on the location thereof. For example, the number of the electron emission regions 26 corresponding to the light emission pixel at a corner portion may be 25 and the number of the electron emission regions 26 corresponding to the light emission pixel at a portion adjacent to the corner portion is 30. When the conductor lines 221 are connected to the respective cathode electrodes 22, the length of the conductor line gradually increases toward inside of the light emission device 1000. As the length of the conductor line increases, the resistivity thereof increases. That is, as the cathode electrode 22 is located farther away from the line extending side end of the light emission device 1000 in an extension direction (a y-axis) of the conductor line 221, the driving voltage applied to the cathode electrode 22 is lowered. Therefore, the respective light emission pixels differ in an amount of electrons emitted therefrom. This causes a lack of luminance uniformity of the screen. Therefore, as shown in FIG. 1, the number of the electron emission regions 26 of each light emission pixel increases as the light emission pixel is located farther away from the line extending side end of the light emission device 1000, thereby making the luminance of the screen uniform.

A phosphor layer 32 is further provided on the second substrate 14. Since the anode electrode 30 is applied with a high voltage, the electrons emitted from the electron emission regions 26 collide with the phosphor layer 32 by being accelerated by the high voltage applied to the anode electrode 30. Hence, light is emitted from the phosphor layer 32 to an external side through the second substrate 14. The phosphor layer 32 may be a white phosphor layer 32 emitting white light to the external side. Alternatively, the phosphor layer 32 may be a combination of red, green and blue phosphor layers emitting light with a variety of colors. In this case, a black layer 34 (see FIG. 4) is formed between the red, green and blue phosphor layers to absorb external light, thereby improving contrast.

As shown in FIG. 1, the phosphor layer 32 and the anode electrode 30 are layered on the second substrate 14 in this order. Since the phosphor layer 32 is formed close to the second substrate 14, the anode electrode 30 does not interfere with the light emitted from the phosphor layer 32. Therefore, the anode electrode 30 may be formed of non-transparent metal having relatively high electric conductivity.

Alternatively, the anode electrode 30 and the phosphor layer 32 may be layered on the second substrate 14 in this order. In this case, the anode electrode 30 may interfere with the light emitted from the phosphor layer 32. Therefore, the anode electrode is formed of a transparent material such as ITO.

Figure 2:
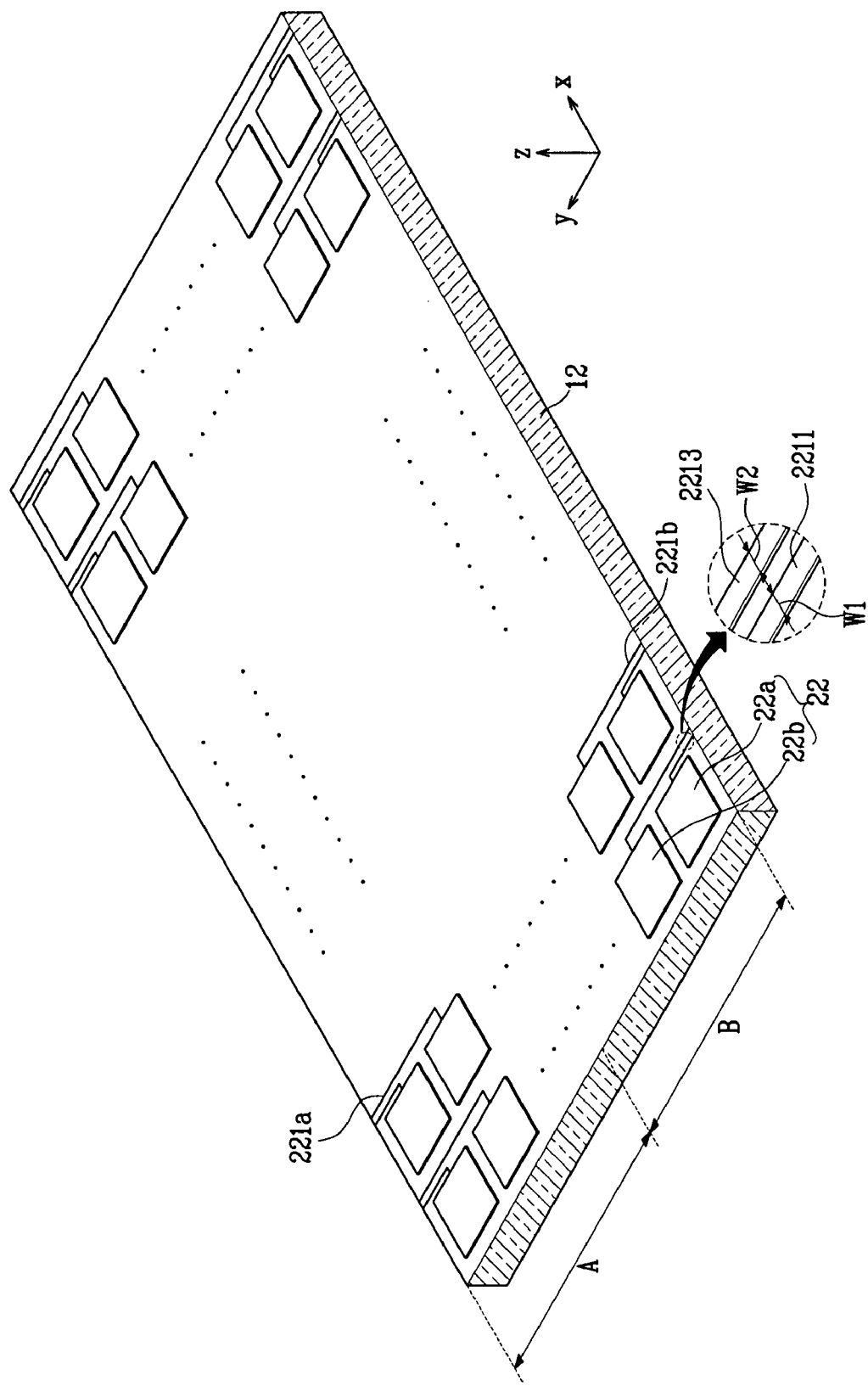
FIG. 2 is a schematic view of an arrangement of cathode electrodes of FIG. 1.

FIG. 2 schematically shows an arrangement of the cathode electrodes arranged on the first substrate 12. For convenience, only the cathode electrodes 22 near the corners of the first substrate 12 are illustrated in FIG. 2. The cathode electrodes 22 are substantially formed on an entire surface of the first substrate 12 and are spaced apart from each other. In an enlarged circle of FIG. 2, the conductor lines 221 are enlarged and illustrated.

As shown in FIG. 2, the cathode electrodes 22 are arrayed and are spaced apart from each other. The conductor lines 221 are connected to the respective cathode electrodes 22. The conductor lines 221 extend to an external side through a path defined between the adjacent cathode electrodes 22. The conductor lines 221 are connected to respective integrated circuits (1121 of FIG. 6) at the external side of the first substrate 12. The integrated circuits 1121 generate driving voltages that will be applied to the respective cathode electrodes 22.

In one embodiment, when the number of the cathode electrodes 22 is too great and the conductor lines connected to the cathode electrodes 22 extend to only one side of the first substrate 12, it is difficult to form the conductor lines since the extending space is too narrow. When the extending space is enlarged to form the conductor lines, there may be an increase of an inactive area where the image is not displayed. Therefore, the conductor lines 221 are grouped into first conductor lines 221a and second conductor lines 221b according to the location of the cathode electrodes 22. The first conductor lines 221a may extend in a direction opposite that of the second conductor lines 221b.

In order to achieve such a structure, as shown in FIG. 2, a surface of the first substrate 12 is divided into a first half region A and a second half region B. Further, the cathode electrodes 22 are divided into a first cathode electrode group and a second cathode electrode group. The first conductor lines 221a connected to the cathode electrodes 22 of the first cathode electrode group extend in a direction of a +y-axis and the second conductor lines 221b connected to the cathode electrodes 22 of the second cathode electrode group are drawn out in a direction of a −y-axis. Through the use of this structure, the extending space can be minimized and the conductor lines 221 can be efficiently drawn out.

In the enlarged circle of FIG. 2, two of the conductor lines 2211 and 2213 among the plurality of the conductor lines 221 are amplified to be illustrated. The conductor line 2211 is connected to the cathode electrode 22a and the conductor line 2213 is connected to the cathode electrode 22b. Since the cathode electrode 22b is located farther away from the line extending side end of the first substrate than the cathode electrode 22a, the conductor line 2213 is longer than the conductor line 2211. Therefore, in one embodiment, when the widths of the conductor lines 2213 and 2211 are substantially the same, the conductor line resistance of the conductor line 2213 is greater than that of the conductor line 2211 and thus the driving voltage applied to the conductor line 2213 may be reduced. If this occurs, an amount of the electrons emitted from the electron emission region corresponding to the cathode electrode 22b is reduced and thus the overall luminance may be deteriorated.

Therefore, a width W2 of the conductor line 2213 is formed to be greater than a width W1 of the conductor line 2211, thereby uniformly maintaining the line resistance of the lines 2213 and 2211. That is, as the length of the conductor line increases, the width of the conductor line also increases in the plurality of conductor lines.

Figure 3:
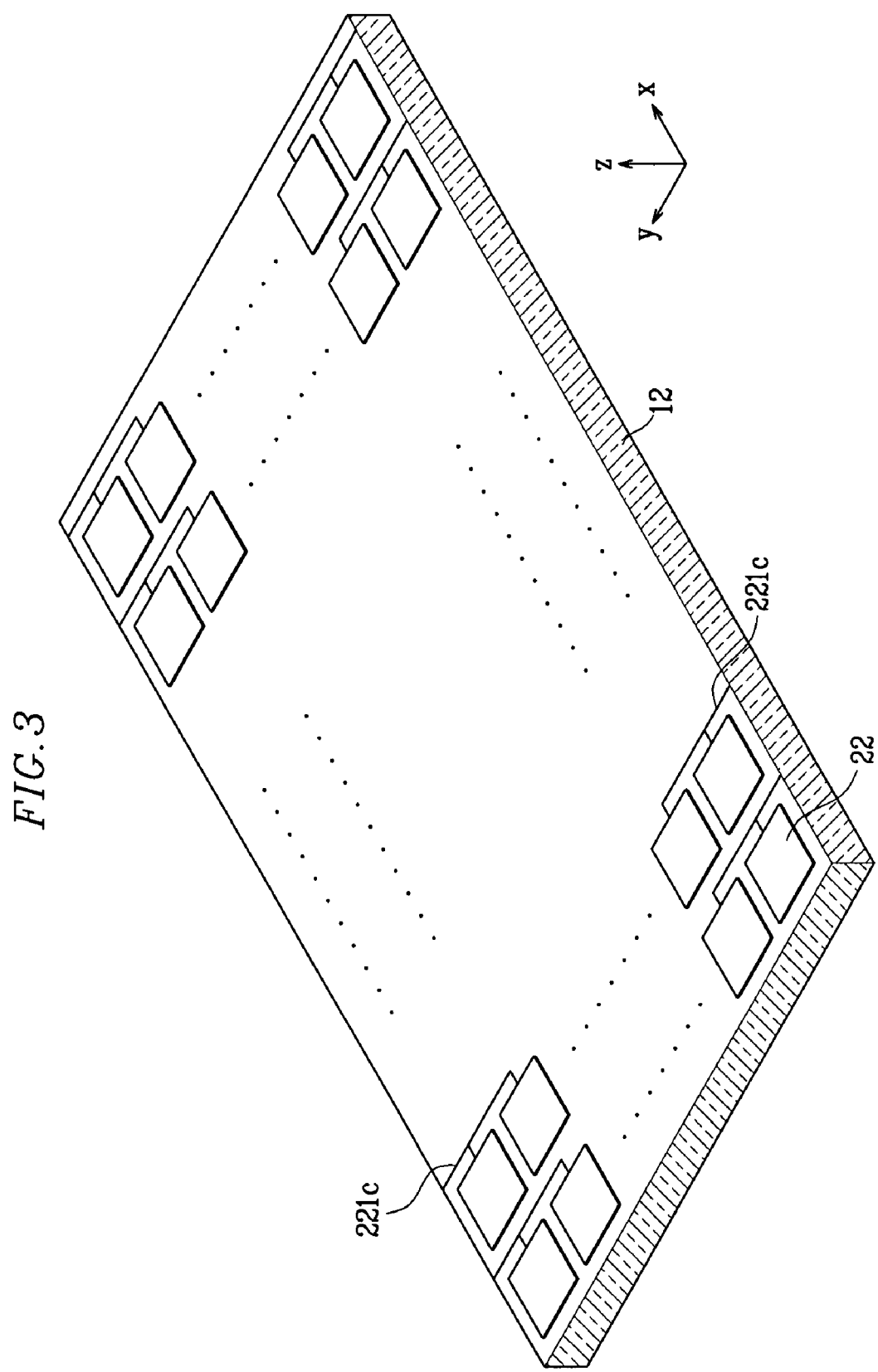
FIG. 3 is a schematic view of a modified example of the arrangement of the cathode electrodes of FIG. 2.

FIG. 3 schematically shows another arrangement of the cathode electrodes 22 located on the first substrate 12. Since an arrangement of the cathode electrodes 22 illustrated in FIG. 3 is substantially identical to that of the cathode electrodes 22 illustrated in FIG. 2 except for conductor lines 221c and 221d, the same reference numbers will be used to refer to the same or like parts and the detailed description of the same or like parts will be omitted herein.

As shown in FIG. 3, two cathode electrodes 22 can be interconnected by one conductor line 221c. Alternatively, three or more cathode electrodes 22 may be interconnected by one conductor line. Referring to FIG. 3, the cathode electrodes are arranged in a line along the y-axis and connected by one conductor line. However, the present invention is not limited to this example. That is, the cathode electrodes arranged in a line along the x-axis may be interconnected by one conductor line. Alternatively, an array of the cathode electrodes may be interconnected by one conductor line.

Since the plurality of the cathode electrodes 22 are interconnected by one conductor line 221c, the line extending space can be minimized and the number of the integrated circuits connected to the respective lines can be reduced. Since the size of the pixel of a light emission device for dim-mode driving may be large, the plurality of the cathode electrodes 22 may be driven together. Therefore, the plurality of the cathode electrodes 22 of the light emission device for the dim-mode driving may be interconnected using one conductor line 221c.

Meanwhile, in order to simplify the arrangement of the lines, adjacent cathode electrodes 22 may be interconnected by one conductor line 221c. In this embodiment, the lines can be more effectively arranged.

Figure 4:
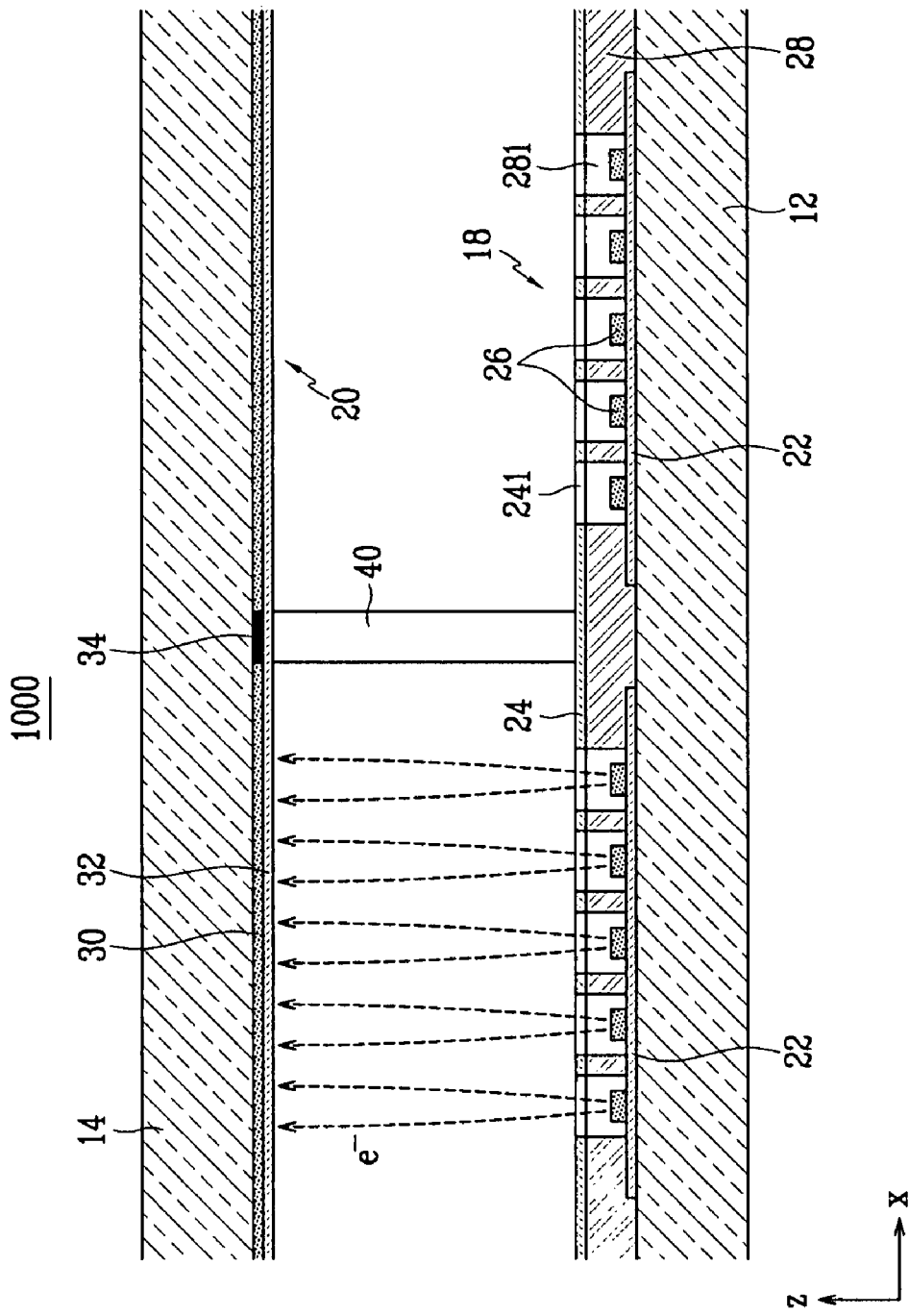
FIG. 4 is a sectional view taken along line IV-IV of FIG. 1.

FIG. 4 is a sectional view taken along line IV-IV of FIG. 1. The following will describe the operation of the light emission device 1000 with reference to FIG. 4.

Driving voltages are applied to the cathode and gate electrodes 22 and 24. In this case, an electric field is formed around the electron emission regions 26 at a pixel where a voltage difference between the cathode and gate electrodes 22 and 24 is greater than a threshold value. As a result, electrons $e^-$ are emitted from the electron emission regions 26. The emitted electrons collide with the phosphor layer 30 of the corresponding pixel by being attracted by the high voltage applied to the anode electrode 32, thereby exciting the phosphor layer 30 to emit light to an external side through the second substrate 14. The light emission intensity of the phosphor layer 30 is proportional to the electron emission amount of the corresponding pixel.

Figure 5:
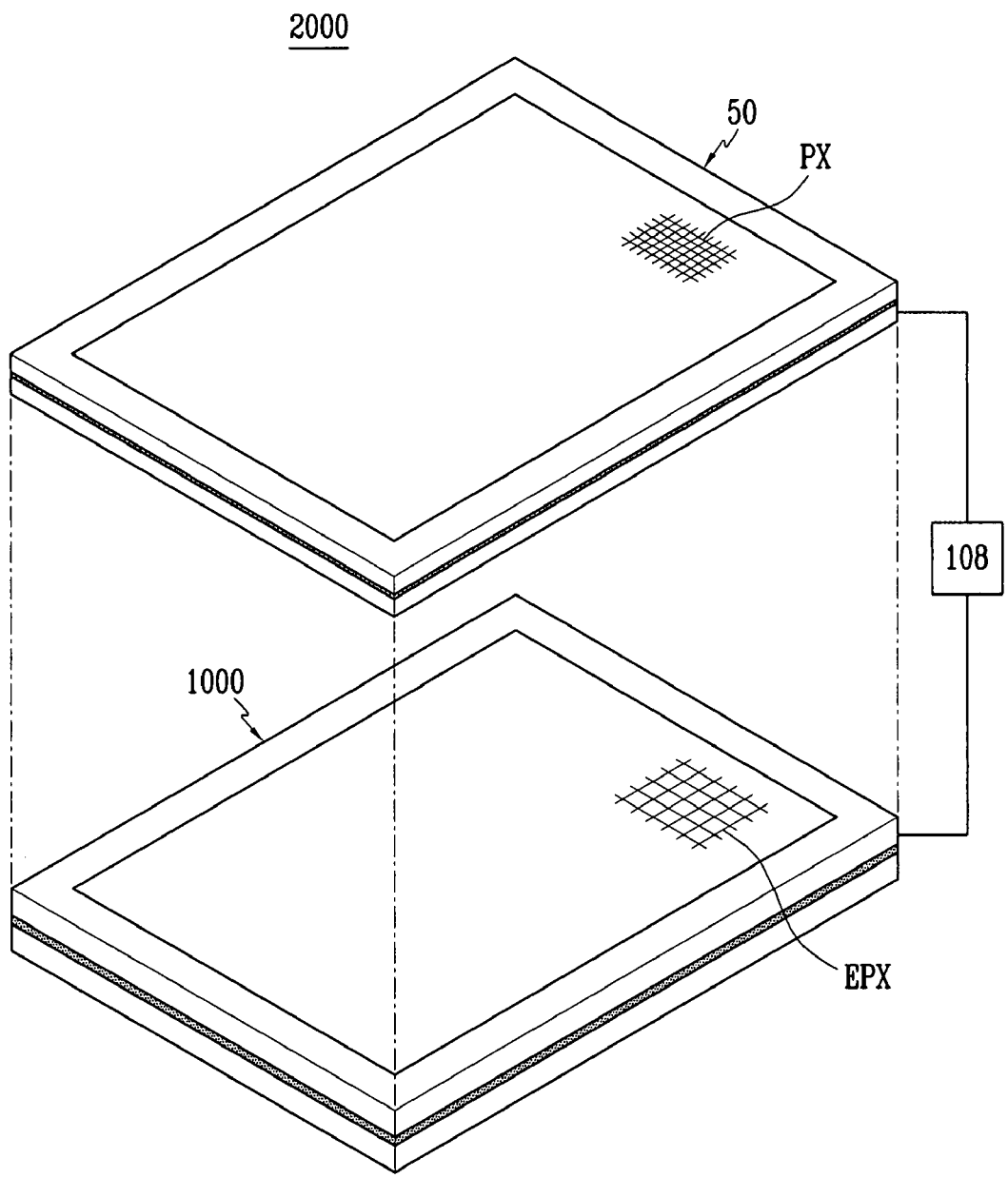
FIG. 5 is a schematic exploded perspective view of a display device according to an exemplary embodiment of the present invention.

FIG. 5 is a schematic exploded perspective view of a display device according to an exemplary embodiment of the present invention. A display device 2000 of this embodiment includes a light emission device 1000 of FIG. 1 and a display panel 50. Since peripheral components of the light emission device 1000 and the display panel 50 are well appreciated by those skilled in the art, a detailed description thereof will be omitted herein.

Since the display panel 50 is not a self-emissive device, it displays an image by receiving light from the light emission device 1000. For example, the display panel 50 may be a liquid crystal display (LCD) panel. Since the LC panel is well appreciated by those skilled in the art, a detailed description thereof will be omitted herein. The driving of the LC panel will be described in more detail hereinafter with reference to FIGS. 6 and 7.

As shown in FIG. 5, the display panel 50 includes a plurality of display pixels PX arranged in lines and columns. The light emission device 1000 includes a plurality of light emission pixels EPX arranged in lines and columns. When the number of the display pixels PX of the display panel 50 in each line is M and the number of the display pixels PX of the display panel 50 in each column is N, the resolution of the display panel 50 can be represented as M×N. When the number of the light emission pixels EPX of the light emission device 1000 in each line is M' and the number of the light emission pixels EPX of the light emission device 1000 in each column is N', the resolution of the light emission device 1000 can be represented as M'×N'. In this embodiment, each of the numbers M and N may be greater than or equal to 240 and each of the numbers M' and N' may range from 2 to 99. That is, the resolution of the display panel 50 is greater than that of the light emission device 1000.

Since a display region of the display panel 50 is substantially identical to that of the light emission device 1000, one light emission pixel EPX of the light emission device 1000 corresponds to two or more display pixels PX of the display panel 50. Therefore, since one light emission pixel EPX emits light for two or more display pixels PX, the contrast ratio is improved and thus the display device 2000 can more clearly display an image. That is, dim-mode driving can be more effectively realized.

Typically, the LC panel has been widely used as the display panel 50. When a cold cathode fluorescent lamp (CCFL) or a light emitting diode (LED) is used as a light source for emitting light to the LC panel, it is difficult to control the intensity of the light for each display pixel. That is, it is impossible or very difficult to realize dim-mode driving.

In one embodiment, since the light emission device 1000 having the electron emission unit is used as the light source, dim-mode driving can be realized. However, since it is expensive to arrange the light emission pixels EPX such that the light emission pixels EPX correspond to the respective display pixel PX, the light emission pixels EPX are arranged such that one light emission pixel EPX can emit light for two or more display pixels PX. The display device 2000 includes a signal control unit 108 to operate the light emission device 1000 so that each of the light emission pixels EPX is driven in response to the corresponding display pixels PX of the display panel 50. The following will describe the operation of the display device 2000 having the signal control unit 108 with reference to FIG. 6 in more detail.

FIG. 6 is a block diagram of a driving part of the display device according to an embodiment of the present invention. Driving elements for a display panel assembly are illustrated in the upper portion of FIG. 6 and driving elements for a light emission device is illustrated in the lower portion of FIG. 6. In one embodiment, as shown in FIG. 6, an LC panel is used as a display panel.

Referring to FIG. 6, a display device 2000 includes a display panel assembly 500, a signal control unit 108, and a light emission device 1000. The display panel assembly 500 includes a first gate driver (or first scan driver unit; hereinafter to be referred to as a first gate driver) 102, a first data driver 104, and a gray voltage generation unit 106. The gray voltage generation unit 106 is connected to the first data driver 104. The light emission device 1000 includes a second gate driver (or second scan driver unit; hereinafter to be referred to as a second gate driver) 114 and a second data driver 112.

When considering the display panel assembly 500 as an equivalent circuit, the display panel assembly 500 includes a plurality of signal lines and a plurality of display pixels PX arranged in lines and columns and connected to the signal lines. The signal lines include a plurality of gate lines $G_1$-$G_n$ (shown as S11-S1n in FIG. 6) for transmitting first scan signals and a plurality of first data lines $D_1$-$D_m$ for transmitting first data signals.

Each first pixel, e.g., a pixel 11 connected to an $i_{th}$ (i=1, 2, ... n) first gate line $G_i$ (shown as S1i in FIG. 6) and a $j_{th}$ (j=1, 2, ... m) first data line $D_j$ includes a switching element Q connected to the $i_{th}$ first gate line $G_i$ and the $j_{th}$ second data line $D_j$, and liquid crystal and sustain capacitors Clc and Cst. In other embodiments, the sustain capacitor Cst may be omitted from the configuration.

The switching element Q is a 3-terminal element such as a thin film transistor (TFT). That is, the switching element Q includes a control terminal connected to the first gate line $G_i$, an input terminal connected to the first data line $D_j$, and an output terminal connected to the liquid crystal and sustain capacitors Clc and Cst.

The gray voltage generation unit 106 generates two sets of gray voltages (or two sets of reference gray voltages) related to the transmittance of the display pixels PX. One of the two sets has a positive value with respect to a common voltage Vcom and the other has a negative value.

The first gate driver 102 is connected to the first gate lines $G_1$-$G_n$ (S11-S1n) to apply a scan signal, which is a combination of a switch-on-voltage Von and a switch-off-voltage Voff, to the first gate lines $G_1$-$G_n$. The first data driver 104, connected to the first data lines $D_1$-$D_m$, selects a gray voltage from the gray voltage generation unit 106 and applies the selected gray voltage to the first data lines $D_1$-$D_m$. However, when the gray voltage generation unit 106 does not provide all of the voltages for all of the gray levels but provides only a predetermined number of reference gray voltages, the first data driver 104 divides the reference gray voltages, generates the gray voltages for all of the gray levels, and converts the gray voltages into a data signal.

Each of the light emission pixels EPX is connected to a second gate line transmitting a common signal and a data line. That is, each of the light emission pixels EPX is defined by the second gate line and the second data line. The second gate line is connected to the gate electrode and the second data line is connected to the cathode electrode.

The signal control unit 108 controls the first gate driver 102, the first data driver 104, the second gate driver 114, and the second data driver 112. The signal control unit 18 includes a light emission control unit 110 for controlling the light emission device 1000. The signal control unit 108 receives input image signals R, G and B and an input control signal for controlling the display of the image from an external graphic controller (not shown).

The input image signals R, G and B have luminance information of each display pixel PX. The luminance has a predetermined number of gray levels (e.g., 1024 or 256 gray levels). The input control signal may be one or more of a vertical synchronizing signal Vsync, a horizontal synchronizing signal Hsync, a main clock signal MCLK, or a data enable signal DE.

The signal control unit 108 properly processes the input image signals R, G and B in response to the operating condition of the display panel assembly 500 with reference to the input control signal. The signal control unit 108 generates a first scan control signal CONT1 and transmits the same to the first gate driver 102. The signal control unit 108 also generates a first data control signal CONT2 and transmits the same to the first data driver 104.

The signal control unit 108 generates a light emission control signal of the light emission device 1000 using the input image signals R, G and B with respect to the display pixels PX corresponding to the light emission pixel EPX. The light emission control signal includes a second gate driver control signal CS, a light emission signal CLS, and a second data driver control signal CD. Each of the light emission pixels EPX emits light in response to the corresponding display pixels PX according to the second gate driver control signal CS, the light emission signal CLS, and the second data driver control signal CD.

Meanwhile, the light emission device 1000 is an active matrix type. Therefore, the light emission pixels EPX are independently driven to emit light.

A typical light emission device is a passive type. When the light emission device 1000 is the active matrix type, an expensive integrated circuit may be required. For example, in the active matrix type LC panel, the time taken for transmitting light through liquid crystal molecules is an overall time excluding a black time and a delay time. Therefore, the on-state of the light emission device is maintained for a long time and thus the LC panel can be driven with a relatively low voltage. On the other hand, in the passive type LC panel, since the on-state of the light emission device is maintained for a short time by a 1/th number of gate electrodes, the passive type light emission device is generally driven with a high voltage. Furthermore, since an 8-bit pulse width modulation (PWM) method should be used, an expensive integrated circuit may be necessary.

Accordingly, in one embodiment, since the active matrix type light emission device 1000 where no scan driving is required is used, a relatively chip integrated circuit may be applied. That is, since the light emission device 1000 can be driven during an entire time excluding the black time and the delay time, it can be driven with a relatively low voltage. Therefore, a relatively cheap integrated circuit may be used. Furthermore, since the light emission pixels can be independently driven, the light emission time increases and thus a relatively low voltage can be used.

The second gate driver 114 applies a common signal C to the plurality of the light emission pixels EPX. That is, a common voltage is applied to the gate electrode. In addition, a data signal is applied to each of the light emission pixels EPX through the second data driver 112. The second data driver 112 includes a plurality of integrated circuits 1121 connected to the respective cathode electrodes of the light emission pixels EPX. Therefore, since the light emission pixels EPX use the respective driving voltages applied from the integrated circuits 1121 to the respective cathode electrodes, the light emission pixels EPX can be independently driven.

The light emission control unit 110 generates a second data driver control signal CD for controlling the integrated circuits 1121 using the horizontal synchronizing signal. The integrated circuits 1121 are driven by the second data driver control signal CD corresponding to the scan signal of the first gate driver 12. Therefore, the integrated circuits 1121 are designed to drive the light emission pixel EPX corresponding to the display pixels PX to which the switch-on voltage is applied by the second data driver control signal CD.

Meanwhile, the signal control unit 108 detects the highest gray level among gray levels of the display pixels PX corresponding to one light emission pixel EPX using input image signals R, G and B of the display pixels PX and then transmits the highest gray level to the light emission control unit 110. The light emission control unit 110 calculates the gray level of the light emission pixel EPX corresponding to the detected gray level and transmits digital data corresponding to the calculated gray level to the second data driver 112.

The light emission control unit 110 generates a light emission signal CLS and transmits the same to the second data driver 112. The light emission signal CLS includes digital data above 6-bits according to a gray level of the light emission pixel EPX. The second data driver 112 controls each of the light emission pixels EPX such that each of the light emission pixels EPX emits the light by synchronizing with the corresponding display pixels PX according to the light emission signal CLS. That is, the second data driver 112 allows each of the light emission pixels EPX to synchronize with the corresponding display pixels PX at a timing point where the image is displayed by the display pixels corresponding to the light emission pixel EPX, i.e., at a timing point where the data signal is applied to the display pixels PX.

The driving method of the display device 2000 will be described in more detail with reference to the internal structure of the display device 2000. The following driving method of the display device 2000 is exemplary only, not limiting the present invention.

It is assumed that the display panel 50 has a 1600×1200 resolution while the light emission device has a 40×20 resolution. In this case, 40×60 display pixels PX correspond to one light emission pixel EPX.

The signal control unit 108 detects the highest gray level among the gray levels of the image signals input to the 40×60 display pixels PX and transmits the detected highest gray level to the light emission control unit 110. The light emission control unit 110 generates 6-bit digital data representing the gray of the light emission pixel EPX corresponding to the detected highest gray level.

The light emission control unit 110 applies the second gate driver control signal CS to the second gate driver 114 so that the common signal C is applied to the light emission pixels EPX. Subsequently, a predetermined gate voltage is applied to the gate electrode according to the applied common signal C.

The second data driver control signal CD generated by the light emission control unit 110 is transmitted to each integrated circuit 1121 of the second data driver 112. The light emission pixel EPX and the corresponding display pixels PX stand by to emit the light by the integrated circuits 1121. Meanwhile, the second data driver 112 applies a cathode voltage to data lines 221 so that each of the light emission pixels EPX can emit light by synchronizing with the corresponding display pixels PX according to the light emission signal CLS.

When the display pixels PX are driven, the light emission pixel EPX corresponding to the display pixels PX emits light according to cathode and gate voltages respectively applied to the cathode and gate electrodes. A negative voltage is applied to the cathode electrode of the light emission pixel EPX and a positive voltage is applied to the gate electrode. The light emission pixel emits the light by a difference between the negative and positive voltages.

In order to represent a plurality of gray levels, the light emission pixels EPX may use a pulse amplitude modulation (PAM) method where a level of the cathode voltage varies. For example, a data voltage or a data signal for displaying the highest gray level is applied to the light emission pixel EPX in response to a timing point where the data signal is initially applied to the corresponding display pixels PX. The data voltage corresponds to the light emission signal CLS.

Alternatively, the light emission pixels EPX may use pulse width modulation (PWM) for modulating a pulse of the data signal in response to a gray level in order to represent a plurality of gray levels. For instance, a data voltage having a predetermined voltage level or a data signal is applied to the light emission pixel EPX during a period corresponding to the highest gray level in response to a timing point where an initial data signal is applied to the display pixels. The data voltage corresponds to the light emission signal CLS. The period corresponds to the light emission signal CLS.

Since the display device represents a gray level of the light emission pixel EPX in response to the corresponding display pixels PX while a frame of image data is displayed, the dynamic contrast of the image can be enhanced.

FIG. 7 is a block diagram of a driving part of a display device according to another embodiment of the present invention. Since a display device 3000 of FIG. 7 is substantially identical to the display device 2000 of FIG. 6 except that only a single second data driver 112 is provided in this embodiment, the same reference numbers will be used to refer to the same or like parts and a detailed description of the same or like parts will be omitted herein.

As shown in FIG. 7, the second data driver 112 having an integrated circuit (not shown) may be installed on only one side of the light emission device 1100. Since the size of each of the light emission pixels EPX is relatively large, the light emission device 1100 has a relatively small number of light emission pixels EPX. Therefore, the number of the lines connected to the light emission pixels EPX and extending along portions defined between the light emission pixels EPX is small and thus the lines 221 can extend toward only one side of the light emission device 1100. Consequently, only one second data driver 112 can be used.

Since a relatively cheap integrated circuit can be applied when the light emission device is structured as explained above, the manufacturing cost of the light emission device can be reduced. In addition, since the gate electrode is fully covered by the insulation layer, arc discharge between the insulation layer and the anode electrode can be prevented.

Although exemplary embodiments of the present invention have been described in detail hereinabove, it should be clearly understood that many variations and/or modifications of the basic inventive concept taught herein still fall within the spirit and scope of the present invention, as defined by the appended claims and their equivalents.

What is claimed is:

1. A light emission device comprising:
   first and second substrates opposing each other;
   a plurality of cathode electrodes that are arranged on the first substrate and spaced apart from each other;
   a gate electrode that is electrically insulated from the cathode electrodes;
   an insulation layer formed between the gate electrode and the cathode electrodes, wherein the insulation layer comprises first and second opposing surfaces which are directed to the first and second substrates, respectively, and wherein a plurality of opening are defined in the gate electrode and the insulation layer;
   a plurality of electron emitters that are electrically connected to each of the cathode electrodes and located in the openings, respectively, wherein the plurality of electron emitters are configured to emit electrons toward the second substrate, via the plurality of openings, respectively;
   a phosphor layer that is formed on the second substrate, wherein the emitted electrons are configured to collide the phosphor layer; and
   an anode electrode that is located on the second substrate, wherein the second substrate is configured to emit light by way of excitation of the phosphor layer,
   wherein the gate electrode substantially completely covers the second surface of the insulation layer.

2. The device of claim 1, further comprising a plurality of conductor lines, which are connected to the plurality of cathode electrodes, respectively, and configured to apply driving voltages to the cathode electrodes, wherein at least one of the conductor lines is configured to pass through a passage defined between adjacent cathode electrodes and extends to peripheral portions of the first substrate, wherein the peripheral portions are directed to the second substrate, and wherein the cathode electrodes are not formed on the peripheral portions.

3. The device of claim 2, wherein as the length of a conductor line increases, the width of the conductor line increases.

4. The device of claim 2, wherein the number of the electron emitters and corresponding openings increases as the electron emitters extend away from the peripheral portions of the first substrate.

5. The device of claim 2, further comprising a plurality of integrated circuits, which are connected to the plurality of conductor lines, respectively, and configured to generate the driving voltages.

6. The device of claim 1, further comprising a plurality of conductor lines, which are connected to the plurality of cathode electrodes, respectively, and configured to apply driving voltages to the plurality of cathode electrodes, respectively,
   wherein the cathode electrodes are divided into a first cathode electrode group and a second cathode electrode group,
   wherein first lines among the conductor lines are connected to the respective cathode electrodes of the first cathode group and second lines among the conductor lines are connected to the respective cathode electrodes of the second cathode group, and
   wherein the first and second lines extend away from each other.

7. The device of claim 1, further comprising a plurality of conductor lines each of which is connected to at least two of the cathode electrodes and configured to apply a common voltage thereto.

8. The device of claim 7, wherein the at least two cathode electrodes are adjacent to each other.

9. The device of claim 1, wherein the insulation layer further comprises third and fourth surfaces located in the openings, and wherein the second surface of the insulation layer does not include the third and fourth surfaces.

10. A display device comprising:
    a light emission device of claim 1, wherein the light emission device is configured to generate light; and
    a display panel configured to receive the generated light as a backlight source and display images.

11. The device of claim 10, wherein the display panel comprises a plurality of first pixels arranged in lines and columns which are substantially perpendicular to each other,
    wherein the light emission device comprises a plurality of second pixels arranged in the lines and columns and
    wherein one of the second pixels corresponds to a plurality of the first pixels.

12. The device of claim 11, wherein at least one of the second pixels is independently driven.

13. The device of claim 12, wherein the plurality of first pixels comprise a pixel having the highest gray level among the plurality of first pixels, and wherein the second pixel is configured to emit light in response to the highest gray level.

14. The device of claim 10, wherein the display panel comprises a liquid crystal panel.

* * * * *